June 18, 1935.     A. H. WIEDHOFFT     2,005,445
REGULATOR
Original Filed March 16, 1931     2 Sheets-Sheet 1
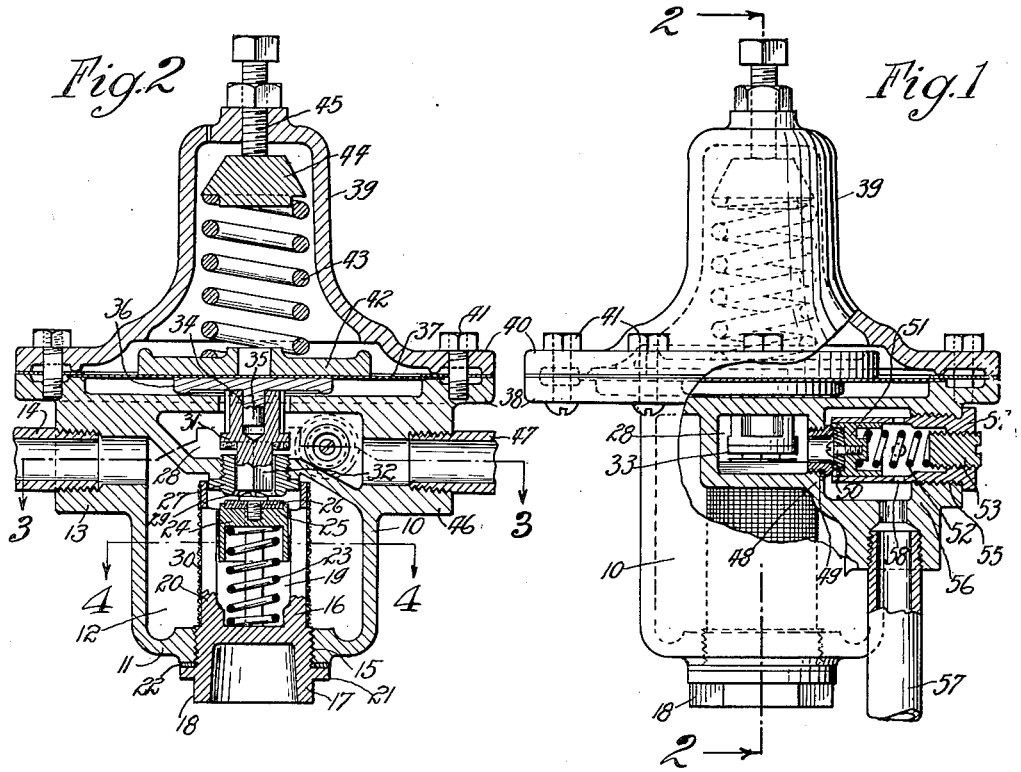
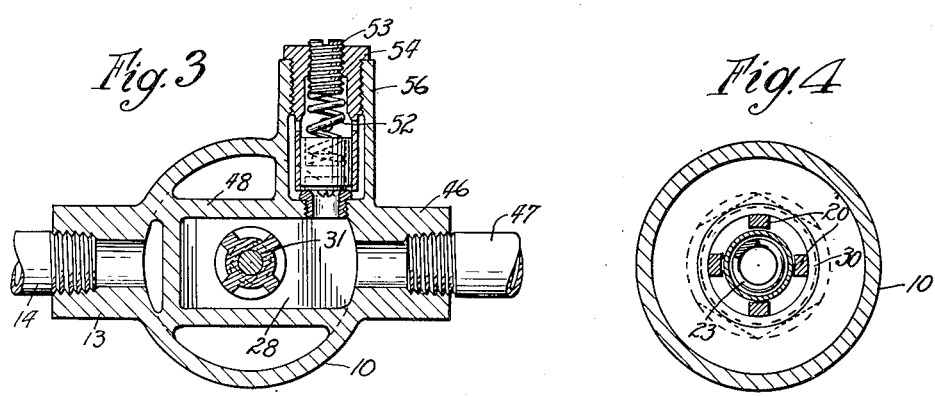
Inventor
Alfred H. Wiedhofft
by Henry Hech
Attorney.

June 18, 1935.　　　A. H. WIEDHOFFT　　　2,005,445
REGULATOR
Original Filed March 16, 1931　2 Sheets-Sheet 2
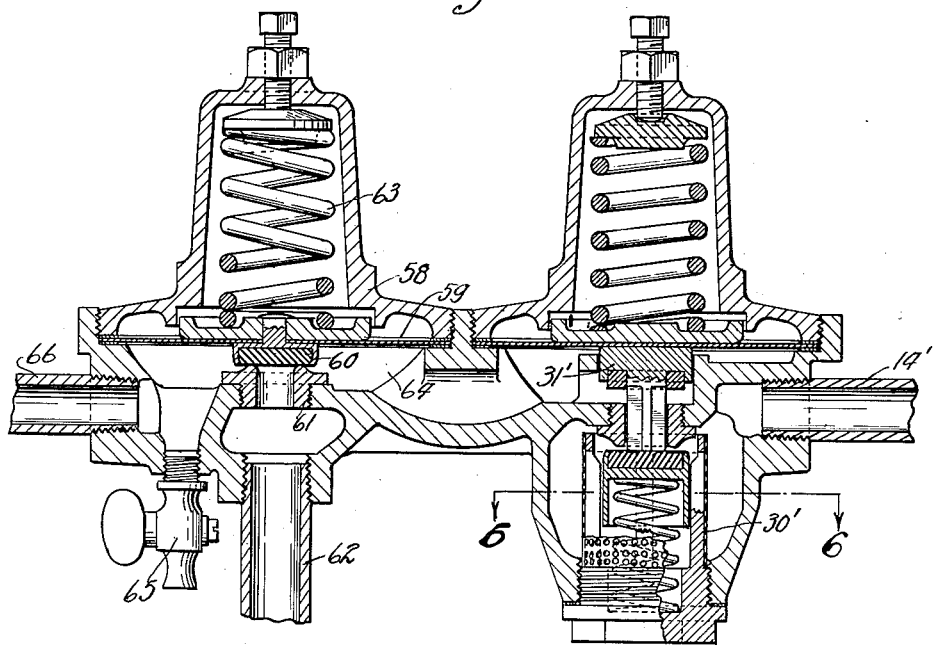
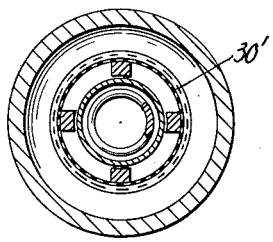
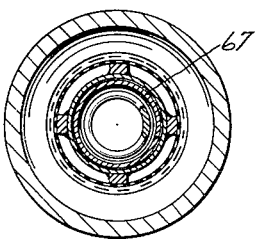
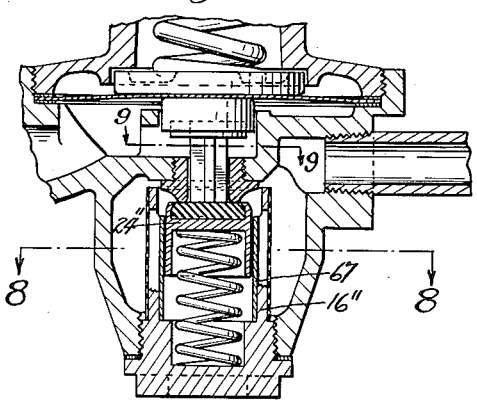
Inventor
Alfred H. Wiedhofft
by Henry Mech
Attorney.

Patented June 18, 1935

2,005,445

UNITED STATES PATENT OFFICE 2,005,445

REGULATOR

Alfred H. Wiedhofft, Chicago, Ill.

Application March 16, 1931, Serial No. 522,807
Renewed November 15, 1934

4 Claims. (Cl. 50—23)

The invention relates to regulators and particularly to those equipped with filters employed for filtering of fluids which may pass the filter while under pressure or without pressure.

It is an object of the invention to provide a filter which may be easily removed, there being means for automatically closing the opening through which the removal of the filter takes place.

A further object of the invention aims at providing a filter which in a pressure system may be removed without lowering the pressure in the system.

Another object aims at providing a filter which in operative position causes the fluid to pass through the system and upon removal seals the system against loss of fluid, thereby maintaining the pressure in the system and yet enabling the filter and its parts to be cleaned and inspected.

It is a still further object of the invention to provide a filter in a fluid system, capable of being removed and thereby sealing the system, so that the removal of the filter for cleaning and inspection precludes the necessity of draining the system.

It is also an object to provide certain details of construction and arrangement of parts tending to enhance the reliability and efficiency of a device of the character described.

With these and other equally important objects in view which will become apparent from a perusal of the invention, the latter comprises the means described in the following specification, particularly pointed out in the claims forming a part thereof and illustrated in the accompanying drawings, in which Fig. 1 is an elevational view of a pressure regulator in which my invention is incorporated, parts being shown in section to disclose interior construction.

Fig. 2 is a section on the line 2—2 of Fig. 1.

Fig. 3 is a section on the line 3—3 of Fig. 2.

Fig. 4 is a section on the line 4—4 of Fig. 2.

Fig. 5 is a vertical sectional view of a pressure regulator embodying my invention.

Fig. 6 is a section on the line 6—6 of Fig. 5.

Fig. 7 is a vertical section through a modification.

Fig. 8 is a section on the line 8—8 of Fig. 7, and

Fig. 9 is a section on the line 9—9 of Fig. 7.

The invention is illustrated in connection with a pressure system. Referring to Figs. 1 to 4, 10 designates a hollow casing closed at the bottom by a wall 11 and providing a fluid receiving chamber 12. The casing 10 has an inlet 13 to receive one end of a pipe 14, the other end of which is connected to a source of fluid supply to permit fluid under pressure to flow into the chamber 12.

Threadedly connected in an aperture 15 of the bottom wall 11 and extending upwardly in the chamber 12 is a one-piece cage 16 which at the lower end forms an integral cap 17. The end portion 18 of the cap may be of hexagonal form for receiving a wrench to facilitate the insertion or removal of the cage 16 into and from the casing 10.

The cage defines a central chamber 19 and terminates at the upper end into a complete annulus. The cage comprises four equally spaced supporting posts 20 (Fig. 4) for permitting fluid to flow into the chamber 12. Interposed between the casing 10 and a flange 21 on the cap 17 is a composition gasket 22 which seats the chamber 12 against the escape of fluid. The gasket may be made of any suitable material such as rubber, cork or the like.

In the chamber 19 a coiled spring 23 of bronze or other corrosion resisting material is provided which rests with its lower end on the bottom of the cage and enters with the upper end in a recess of a downwardly extending flange of a shut-off valve 24.

The upper face of the valve 24 is provided with an annular groove 25 for receiving a valve disk 26 of suitable material adapted to contact with a valve seat 27 threadedly inserted in a partition dividing off from the chamber 12 an upper chamber 28.

The shut-off valve 24 is guided in the chamber of the cage 16 and is urged upwardly against the valve seat 27 by the spring 23 for normally closing the opening 29 of the valve seat 27, so as to prevent the flow of fluid therethrough. A screen or filter 30 surrounds the cage 16 to filter the liquid passing through the cage and keeping the shut-off valve 24 clean.

Attention is called to the fact that the cage 16 carrying the shut-off valve and the filter is threadedly connected to the casing 10 so as to permit the valve mechanism and the filter to be readily removed as a unit for the purpose of cleaning and inspecting the parts thereof.

A check valve 31 is disposed in the opening 29 of the valve seat 27. The lower valve portion is grooved, and the grooves are separated by equally spaced legs 32 contacting at the lower ends with the valve 24. The upper enlarged portion of the check valve 31 is equipped with a valve disk 33 adapted to contact with the upper end of the valve seat 27.

The shank of the valve 31 is provided with a bore 34 to receive a pin 35 of a disk 36 on the under side of a diaphragm 37 placed on a circumferential flange 38 of the casing 10.

A bell shaped housing 39 terminating in a circumferential flange 40 is secured to the flange 38 by a plurality of screws 41 and, a compression disk 42 is placed on the upper side of the diaphragm 37 and supports one end of a coil spring 43, the other end of which is secured to a block 44 engaging a bolt 45 which extends through an aperture at the top of the housing 39.

Diametrically opposite to the inlet 14 is an outlet 46 whence a pipe 47 leads to a heating system (not shown) or to any other device where fluid under pressure is utilized.

To safeguard against excessive pressure a relief valve is provided. To this end a wall 48 is provided with an annular valve seat 49 against which abuts a valve disk 50 of a valve 51 under the influence of a coil spring 52 whose other end bears on a screw plug 53 closing a tubular member 54 which forms a guide for the valve 51. The member 54 is screw-threaded in an aperture 55 of a hollow extension 56 of the casing. The extension 56 is equipped with a relief pipe 57 communicating through an opening 58 in the member 54 and the valve seat 48 with the chamber 28 upon the valve 50 being in open position under the influence of excessive pressure. The operation of the pressure regulating device is as follows:

Fluid enters the pipe 14 and passes through the filter past the slots of valve 31 into the chamber 28 under a pressure regulated by the spring 43. Thence the fluid escapes through the pipe 47. Under excessive pressure the spring 52 is contracted and permits the fluid to escape through the relief pipe 57.

The provision of the valve 31 maintained in open position by the valve 24 carried by the cage which also supports the filter enables removal of the cage and its associated parts as a unit and sealing of the system so that there cannot be a loss of fluid. To remove these parts the cap 18 is unscrewed and the cage, the filter and the valve 31 are removed as a unit. During the process of unscrewing the cage, the valve 31 is actuated downwardly until it contacts with the seat 27 to effectively seal the system.

The modification shown in Figs. 5 and 6 is essentially similar to that shown in the preceding figures, so that only a description of the differentiating parts is given. As will be readily understood by reference to Fig. 5, the relief valve is arranged in a separate housing communicating with the housing containing the regulating valve, the shut-off valve, the cage and filter.

The housing 58 has a diaphragm 59 to which is secured a valve 60 contacting with an annular valve seat 61 through which fluid may escape to a relief pipe 62.

A spring 63 in the housing acts on the diaphragm to maintain the valve 60 in closed position. Fluid enters through inlet pipe 14' passes through the filter 30' and past the check valve 31' to the chamber 64, of the housing 63 and escapes through the outlet pipe 66.

The housing 63 has a valve controlled drain pipe 65 to permit draining of the fluid.

The construction of the shut-off valve, cage and filter and the possibility of removal of the same as a unit are identical with those described in connection with the embodiment shown in Figs. 1 to 4 so that further description thereof is deemed superfluous.

In the modification shown in Figs. 7 and 8 a sleeve 67 is provided between the cage 16″ and the shut-off valve 24″, to more accurately guide the movement of said valve.

The invention has been illustrated in connection with pressure systems but only by way of illustration and not by way of limitation. The use of the invention may be extended to all systems and devices where fluid is to be passed through a filter before reaching storage or the location of its application.

While the drawings show preferred embodiments of my invention they are merely indicative of the principle on which the invention is predicated. Numerous changes and alterations may be made without departing from the spirit and purview of my invention.

I, therefore, wish to include all changes and alterations constituting departures within the scope of the invention as defined in the appended claims.

I claim:

1. In combination with a casing, its chamber and a check valve controlling the entry of fluid into said chamber, a cage removably secured to said casing, a screen surrounding said cage and supported thereby and a valve in said cage normally holding said check valve in open position to establish communication between said cage and said chamber and permitting closure of said check valve upon removal of said cage.

2. In a pressure regulator a hollow casing having a chamber therein arranged for receiving fluid under pressure, a regulating unit in said casing including a guiding member, a cap normally closing an opening in said casing and with which said member is united, a valve in said member, filter means secured to said member, and means for actuating said valve for regulating the fluid pressure in said chamber, and gravity valve means associated with said regulating unit to permit removal thereof as a unit for cleaning without lowering the fluid pressure in said chamber.

3. In a pressure regulator, a hollow casing having an inlet and outlet and a valve seat between said inlet and outlet, a cap threaded to the casing and normally closing an opening therein below the valve seat and upon the inlet side thereof, a guiding member including spaced uprights connected to said cap, a screen around said member, a spring pressed valve within said member seating upwardly against said seat, a second valve above the seat, having a stem engaging the first valve whereby the second valve is held off the seat when the first valve is in place, a spring pressed diaphragm bearing on the second valve to control through the latter, opening and closing of the first valve, said first valve, screen and guiding member being removable as a unit from the casing along with said cap, and said second valve being freely movable by gravity downwardly onto the said seat, irrespective of movement of the diaphragm upon removal of said unit to prevent outflow of regulated pressure from the casing through its said opening.

4. In a pressure regulator, a hollow casing having an inlet and an outlet, a valve seat therein, a regulating valve seating upwardly against said seat at the inlet side thereof, a screen-supporting closure member with which said regulating valve is associated and removable from the casing, an annular rib upstanding around the valve seat and having openings therethrough, a check valve normally upstanding above the said rib and guided therein to seat downwardly on the valve seat when the regulating valve is removed, said check valve having a depending portion normally engaged by the regulating valve to hold the check valve in elevated position, and a spring pressed diaphragm bearing directly on said check valve to control the regulating valve, said diaphragm being limited in its downward movement by said rib whereby to permit the check valve to seat by gravity when the regulating valve is removed.

ALFRED H. WIEDHOFFT.